United States Patent [19]
Okamura et al.

[11] Patent Number: 5,373,403
[45] Date of Patent: Dec. 13, 1994

[54] METHOD AND APPARATUS FOR AUTOMATIC GAIN CONTROL AMPLIFIER ADJUSTMENT FOR A MAGNETIC MEDIUM

[75] Inventors: Hiroshi Okamura; Hideo Masaki; Tetsuji Sakurai; Katsuhiko Kaida; Takahiro Koyanagi, all of Tokyo, Japan

[73] Assignee: Kabushiki Kaisha Toshiba, Kawasaki, Japan

[21] Appl. No.: 827,623

[22] Filed: Jan. 29, 1992

[30] Foreign Application Priority Data

Jan. 30, 1991 [JP] Japan ................ 3-029300
Nov. 8, 1991 [JP] Japan ................ 3-292726

[51] Int. Cl.⁵ .............. G11B 5/02; G11B 5/09; G11B 15/52; G11B 20/12
[52] U.S. Cl. .................. 360/67; 360/27; 360/46; 369/48
[58] Field of Search ............ 360/27, 46, 67, 77.02, 360/77.05, 77.06, 77.08, 78.04, 78.14; 369/47, 48, 49

[56] References Cited

U.S. PATENT DOCUMENTS 4,933,783 6/1990 Yasui ................ 360/46
5,140,477 8/1992 Hashimoto ........ 36/77.05
5,144,504 9/1992 Kitazawa .......... 360/78.04

FOREIGN PATENT DOCUMENTS 511875 11/1992 European Pat. Off. ........ 360/27

Primary Examiner—Donald Hajec
Assistant Examiner—T. N. Forbus, Jr.
Attorney, Agent, or Firm—Finnegan, Henderson, Farabow, Garrett & Dunner

[57] ABSTRACT

In a sector servo type hard-disk apparatus, in the case where a recording medium is not manufacture-formatted, gain control data is written/read in/from a CSS zone of the recording medium after power is turned on and before the first seek is executed. The write/read of the gain control data in/from the CSS zone is also executed in accordance with a peak level of an output signal from an AGC amplifier.

28 Claims, 10 Drawing Sheets

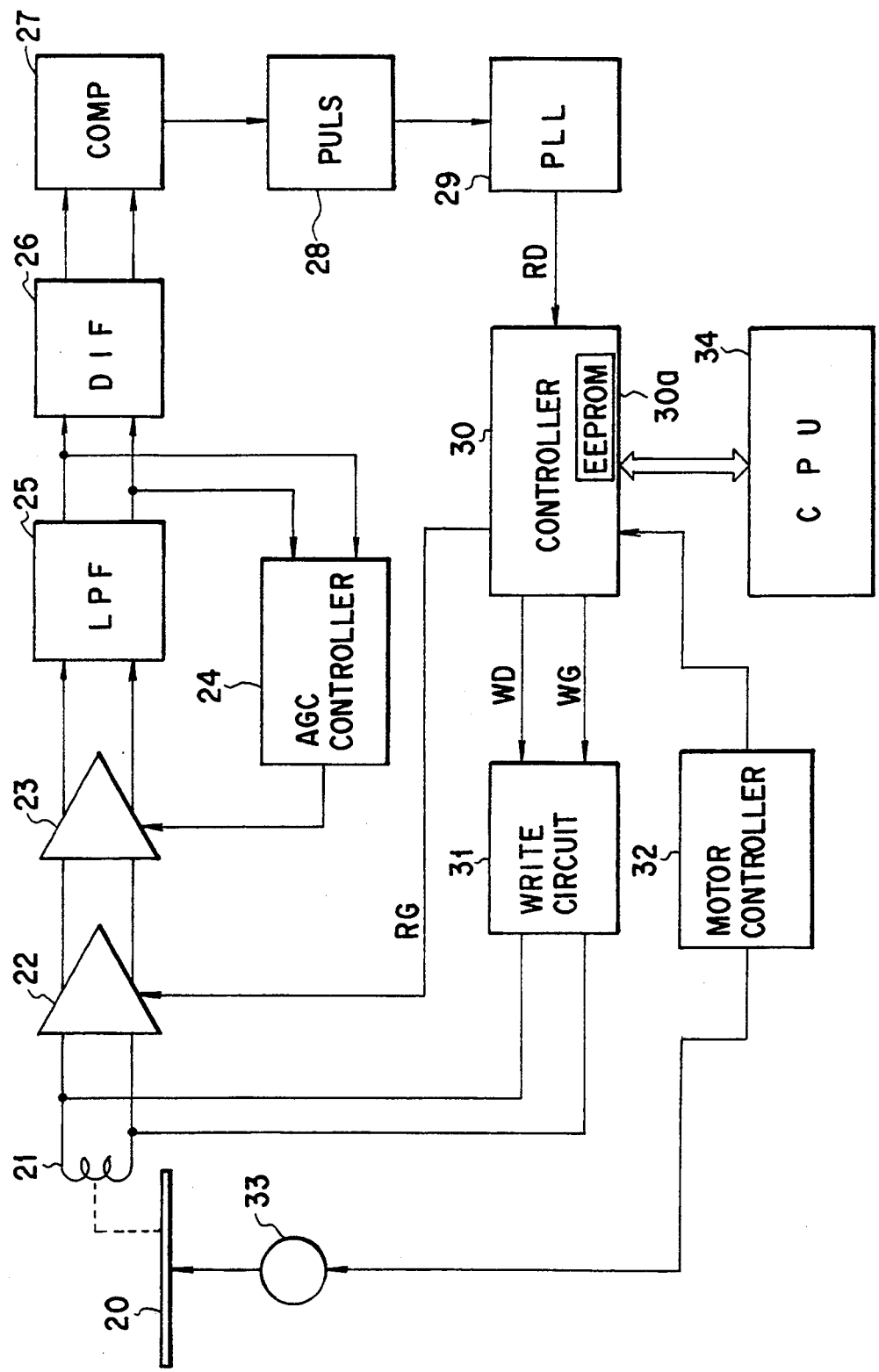
F I G. 3

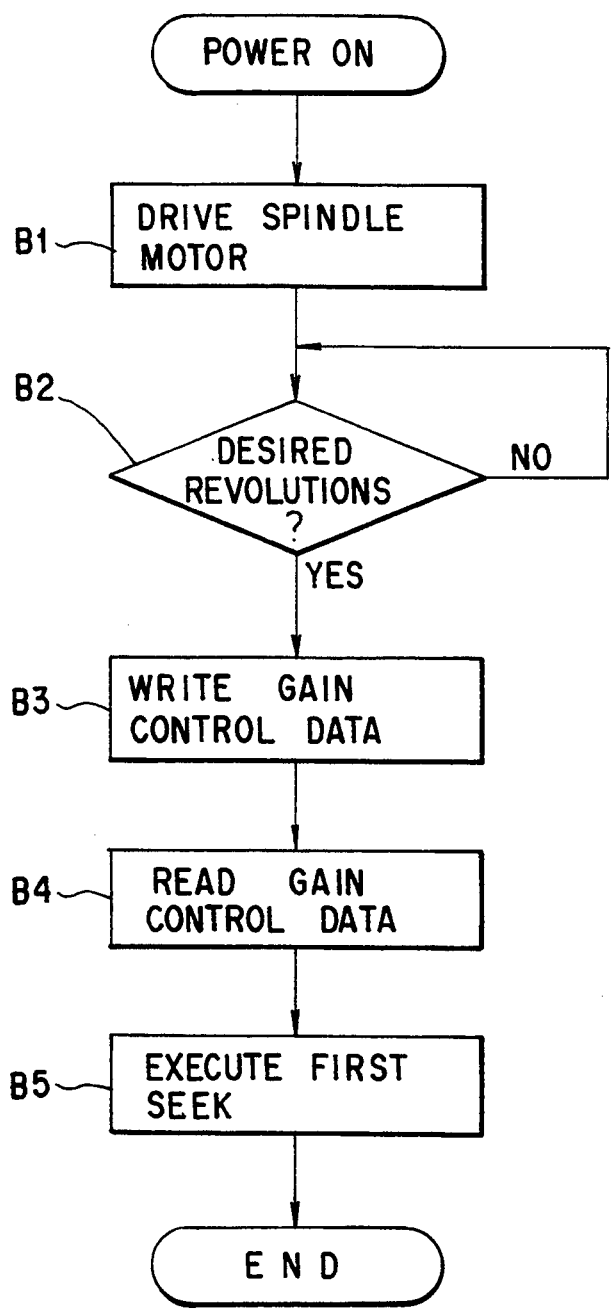
F I G. 5

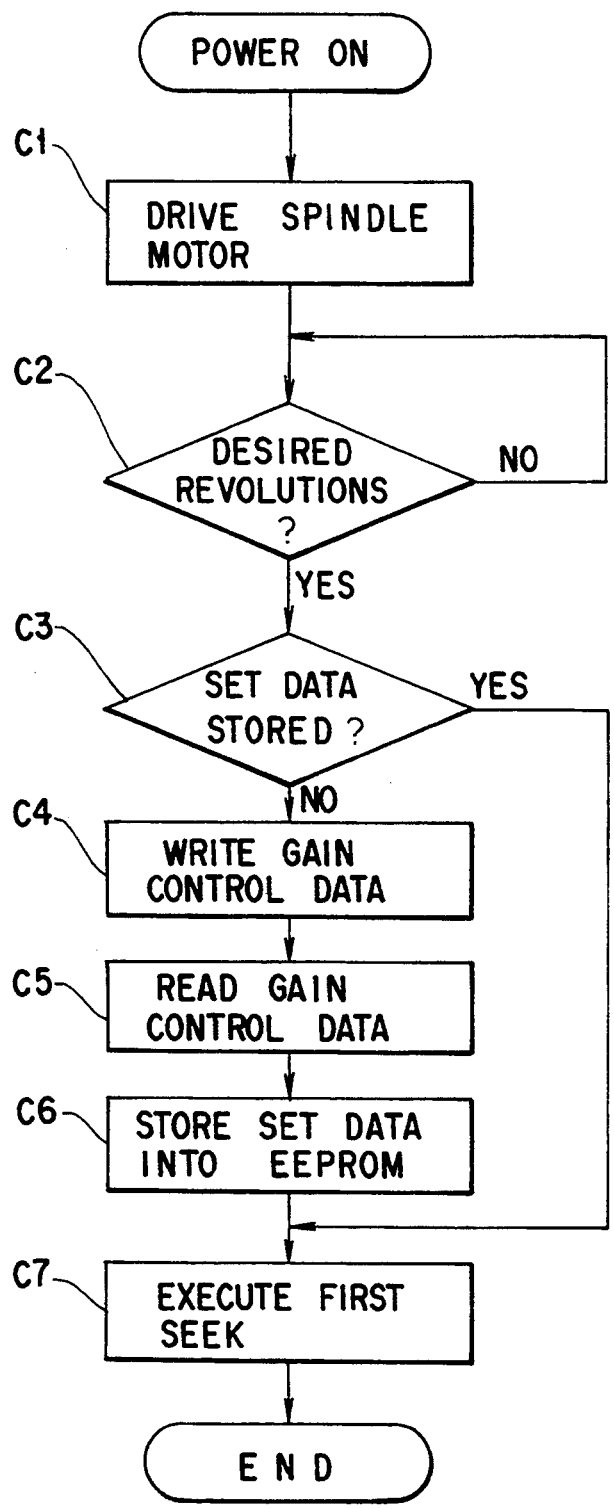
F I G. 6

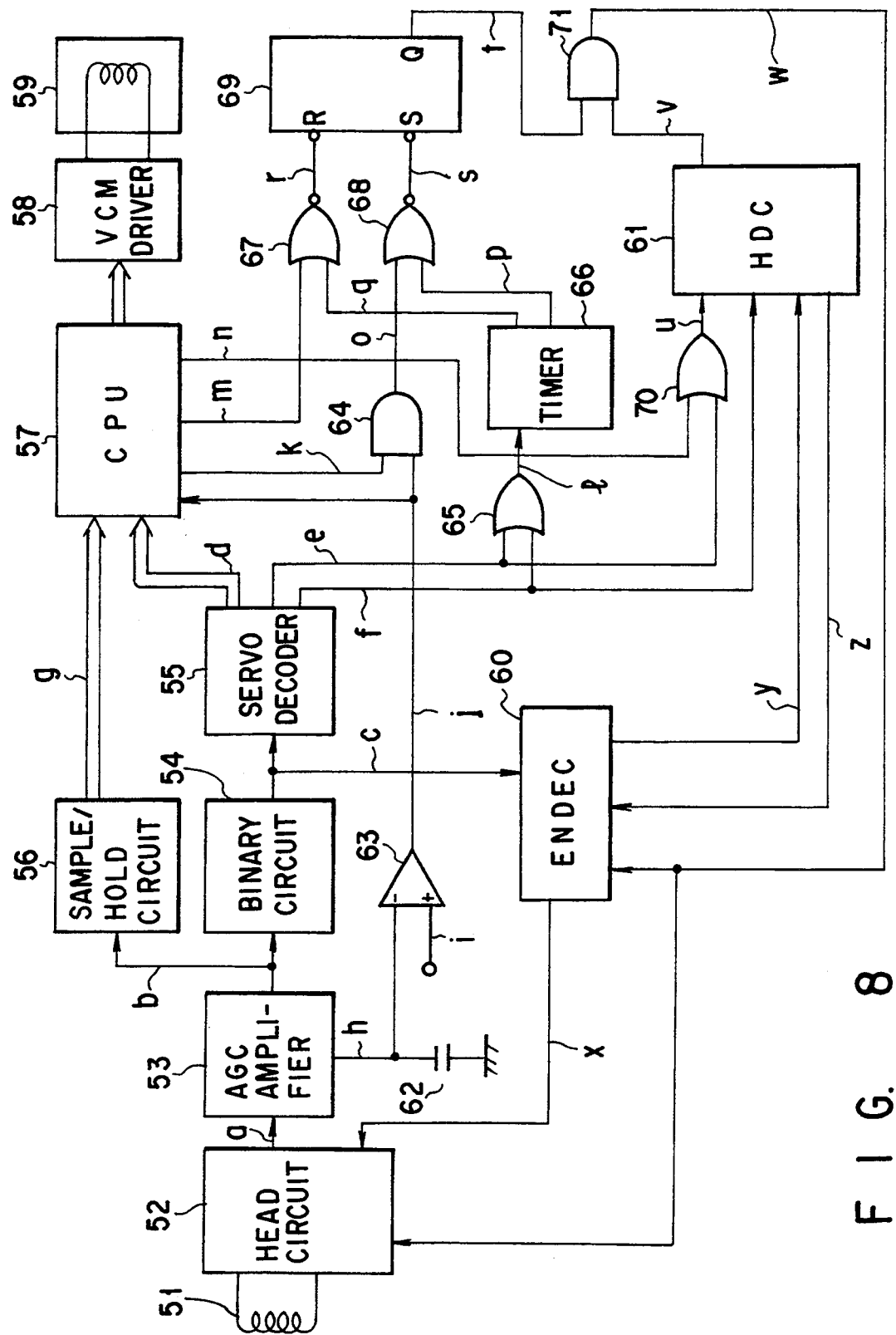
F I G. 8

METHOD AND APPARATUS FOR AUTOMATIC GAIN CONTROL AMPLIFIER ADJUSTMENT FOR A MAGNETIC MEDIUM

BACKGROUND OF THE INVENTION

1. Field of the Invention

The present invention relates to a magnetic recording and reproducing apparatus such as a hard disk drive.

2. Description of the Related Art

Conventionally, a hard-disk drive adopts a system wherein servo information for controlling positioning of a magnetic head is recorded on a recording medium for dedicated use, which is different from a recording medium (disk) on which data is read/written by a user. According to this system, servo information can be continuously obtained, but a recording medium for dedicated recording servo information must be provided. As a result, the recording density of the entire hard disk is low.

In order to meet the demand for a higher recording density, a system has been proposed wherein servo information is recorded in advance in the same recording medium as is employed for storing read/write data by the user, A typical system is a sector servo system. According to this system, a plurality of tracks are provided concentrically in each recording medium. Each track is divided into a plurality of sectors. Each sector includes a data storage area in/from which data is written/read by the user, a servo storage area in which servo information for positioning control of a magnetic head, and an area in which a track number and a sector number in each track are recorded. According to the sector servo system, the servo information is recorded intermittently in the recording medium.

In the system wherein servo information is recorded in the dedicated recording medium, a displacement in position occurs between a servo head (a head for reading servo information) and a data head (a head for reading/writing data treated by the user) due to a difference in thermal expansion of mechanical parts. On the other hand, no such displacement occurs in the sector servo system, but it is necessary to record servo information in all recording mediums. In addition, servo information cannot be obtained continuously. In particular, since servo information is recorded in advance in all recording mediums before the products are shipped, the time for production is adversely affected in the case of mass-producing recording mediums.

FIG. 1 shows schematically the structure of the recording medium. When the hard-disk drive is not activated, as shown in FIG. 1, that is, the power is off, a magnetic head 11 is situated in contact with a contact start and stop (CSS) zone 13 provided in an inner annular portion of the recording medium 12. The CSS zone 13 is provided on the recording medium 12, separately from a data zone 14. Information is not stored commonly in the CSS zone 13.

When the power is turned on and the rotation speed of the recording medium 12 reaches a predetermined value, the magnetic head 11 floats from the recording medium 12 and thereafter the magnetic head 11 starts to move towards the track 0 (zero) provided in the radially outermost portion. This is called "first seek." In particular, in the first seek after servo information is recorded by a servo writer, each track of the recording medium 12 is in the initial state, as shown in FIG. 2. That is, since each track has not been "manufacture-formated," information other than servo information cannot be read out from the servo area of each track. The term "manufacture format" in this context means a physical format produced by a pre-shipment test on a recording medium on which only servo information is recorded, and differs from an ordinary format obtained by the user's formatting. Although it is possible to record not only the servo information but also other information on the recording medium by using the servo writer, recording of information by the servo writer consumes a considerable time. The manufacture time can be made shorter when only servo information is recorded on the recording medium by using the servo writer resulting in higher manufacture efficiency.

Since no information is recorded in the CSS zone 13, as stated above, an automatic gain control (AGC) gain for controlling the level of an output signal of the magnetic head 11 is set at a maximum value while the magnetic head 11 moves over the CSS zone 13. When the magnetic head 11 moves over the data zone 14 and starts to read out servo information recorded on the servo area of each track, the AGC gain is stabilized (see FIG. 2).

However, in the first seek, it is highly possible that the magnetic head 11 overruns before the AGC gain is stabilized. This is because servo information cannot be read exactly in the case where the AGC gain is not stable and the seek control of the magnetic head is disabled. If the magnetic head 11 overruns, data read/write is disabled and, in addition, the magnetic head 11 moves as if to go beyond the radially outermost portion of the recording medium 12, as a result of which the magnetic head 11 and recording medium 12 may be damaged.

Under the situation, there is a demand for a magnetic recording and reproducing apparatus capable of stabilizing the AGC gain at the time of the first seek, without lowering the manufacture efficiency.

SUMMARY OF THE INVENTION

The object of the present invention is to provide a magnetic recording and reproducing apparatus capable of stabilizing a gain of an AGC amplifier at the time of first seek.

According to the present invention, there is provided a hard-disk apparatus comprising: a recording medium having a data zone in which at least servo data is recorded; head means for performing data-read/write for the recording medium; head moving means for moving the head means to a desired position over the recording medium; automatic gain controlled amplifier means for amplifying an output signal from the head means to obtain an output signal having a desired level; and gain setting means for setting a gain of the automatic gain controlled amplifier means at a suitable value after power is turned on and before the head means is moved to the desired position over the data zone of the recording medium by the head moving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing the structure of a hard-disk apparatus of a sector servo system according to a first embodiment of the present invention;

FIG. 5 is a first operation flowchart for illustrating the execution of the first seek in the hard-disk apparatus according to the first embodiment of the invention;

FIG. 6 is a second operation flowchart for illustrating the execution of the first seek in the hard-disk apparatus according to the first embodiment of the invention;

FIG. 8 is a block diagram showing the structure of a hard-disk apparatus according to a second embodiment of the invention;

DETAILED DESCRIPTION OF THE PREFERRED EMBODIMENTS

Embodiments of the present invention will now be described with reference to the accompanying drawings.

Figure 1:
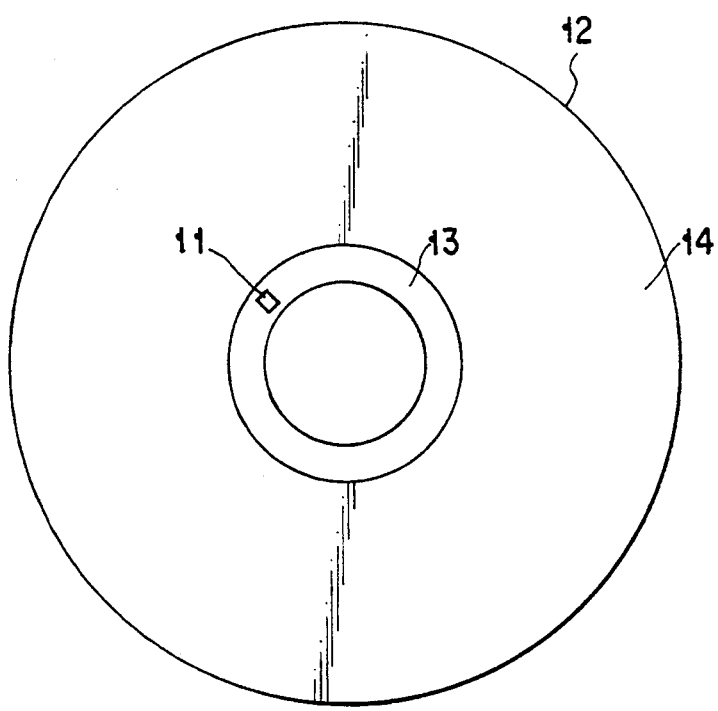
FIG. 1 is schematically the structure of a recording medium.
Figure 2:
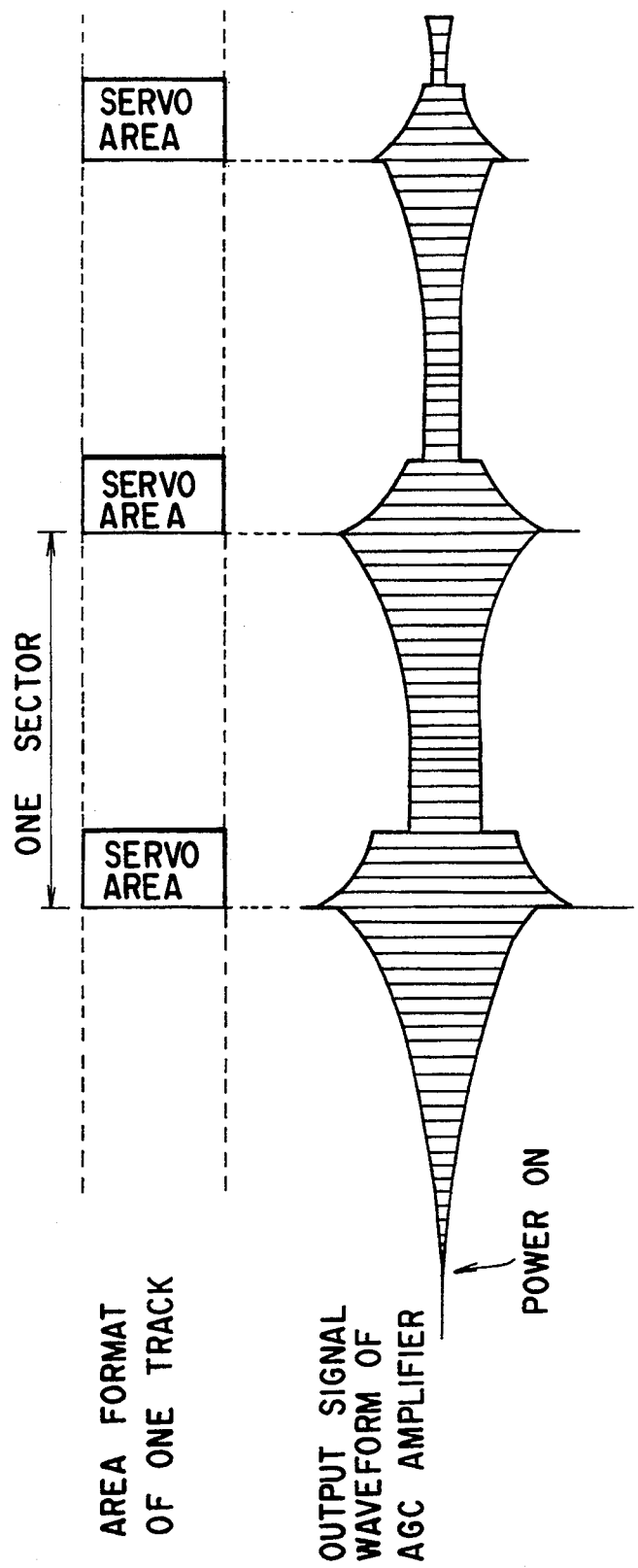
FIG. 2 shows an area format of one track after only servo information is recorded, and an AGC signal wave-form output from an AGC amplifier by the first seek of this track.

FIG. 3 is a block diagram showing the structure of a hard-disk apparatus of a sector servo system according to a first embodiment of the present invention. As in FIG. 1, a recording medium 20 has a CSS (contact start and stop) zone and a data zone. The CSS zone is employed in the CSS system so that a magnetic head 21 may be put in contact with the recording medium 20 while the rotation of the recording medium 20 is stopped. For example, the CSS zone is provided in the radially innermost portion of the recording medium 20. A plurality of tracks are concentrically provided on the data zone. Each track is divided into a plurality of sectors, and each sector includes a data area in which data is read/written by the user, a servo area for storing servo information for the positioning control of the magnetic head, and an area for storing a track number and a sector number of each track.

Information recorded on the recording medium 20 is read out by the magnetic head 21 as an analog reproduced signal. The reproduced signal is amplified by a head amplifier 22 and then amplified by an AGC (automatic gain control) amplifier 23 on the basis of an AGC gain set by an AGC controller 24. Any high-frequency noise included in the reproduced signal is removed by a low-pass filter (LPF) 25. The reproduced signal, from which the high-frequency noise has been removed, is converted to digital read data RD by a differentiating circuit (DIF) 26, a comparator (COMP) 27, a pulse generating circuit (PULS) 28 and a phase lock loop (PLL) 29. The read data RD is supplied to a controller 30.

The controller 30 controls the whole hard-disk apparatus under the control of a CPU 34 included in a host system (not shown). The controller 30 outputs a read gate signal RG, a write gate signal WG and write data WD. The controller 30 includes a hard-disk controller (not shown) for performing data read/write and data exchange between the controller 30 and the host system.

A write circuit 31 is used to write data. The write circuit 31 supplies a write current to the magnetic head 21 on the basis of the write gate signal WG and write data WD. A motor controller 32 controls a spindle motor 33 for rotating the recording medium 20. The magnetic head 21 is moved to a desired track on the recording medium 20 by a carriage (not shown). The carriage is driven by a voice coil motor (not shown).

The operation of the hard-disk apparatus according to the first embodiment of the invention will now be described.

Figure 4:
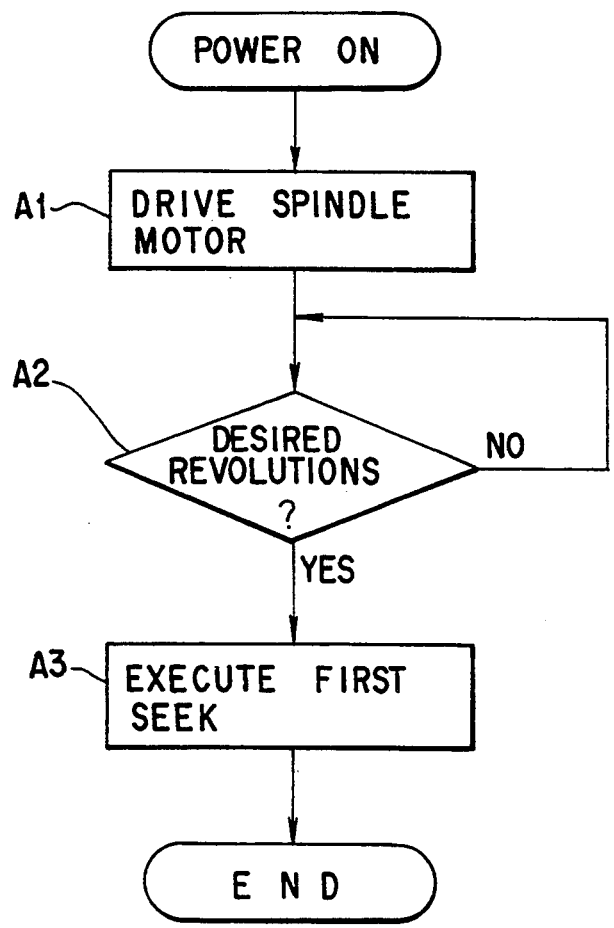
FIG. 4 is a flowchart for illustrating the first seek in a conventional hard-disk apparatus.

FIG. 4 is a first operation flowchart for illustrating the first seek of a conventional hard-disk apparatus. Power is turned on, and the spindle motor is driven (step A1). Thereby, the recording medium is rotated. When the rotation speed of the recording medium has reached a desired value or a desired number of revolutions (step A2), the magnetic head is moved towards the radially outermost track of the recording medium by the carriage and thus the first seek is carried out (step A3). Thereafter, responding to a request from the host system, the magnetic head 21 is moved to a desired track to perform data read/write.

The operation of the apparatus according to the first embodiment differs from that of the conventional apparatus with respect to the operation after the rotation speed of the recording medium 20 has reached a predetermined value. Specifically, when the rotation speed of the recording medium has reached a predetermined value, data write/read is executed on the CSS zone before the first seek is started.

FIG. 5 is a first flowchart for illustrating the execution of the first seek in the hard-disk apparatus according to the first embodiment of the invention. When power is turned on, the spindle motor 33 is actuated by the motor controller 32 (step B1). When the rotation speed of the spindle motor 33 has reached a predetermined value (step B2) and the magnetic head 21 floats from the recording medium 20 and is set in the data read/write enable state, the CPU 34 outputs a write command and write data WD to the controller 30. Thus, gain control data is recorded in the CSS zone by the write circuit 31 (step B3). The gain control data is employed to specify the AGC gain of the AGC amplifier 23 when the tracks are in the initial state. The gain control data has a predetermined frequency in an operation band of the AGC amplifier 23.

When a read command is output from the CPU 34 to the controller 30, the gain control data recorded on the CSS zone is read (step B4). The read-out of gain control data is continued until the AGC gain of the AGC amplifier 23 is stabilized, for example, by presetting a read time in a timer (not shown). After the AGC gain is stabilized, the first seek is carried out (step B5).

As stated above, when the tracks are in the initial state, that is, information other than servo information is not recorded on the recording medium, the AGC gain is specified in advance. Thereby, in the first seek, servo information recorded intermittently can be read out exactly. Therefore, overrun of the magnetic head 21 for example, can be prevented.

Regarding such gain control data, information other than servo information can also be written on the recording medium by the servo writer, for example, when the hard-disk apparatus is manufactured. However, if the information other than servo information is written in the CSS zone at the time of manufacture, much time is required for the recording of information by the servo writer. As a result, the manufacture efficiency is lowered. If the manufacture efficiency is considered, it is desirable to record the gain control data before the first seek is carried out, as in the first embodiment of the invention. In this case, it is freely chosen whether the gain control data is recorded each time the power is turned on or recorded by the user's designation.

FIG. 6 is a second operation flowchart for illustrating the execution of the first seek in the hard-disk apparatus according to the first embodiment. The second operation flowchart is basically identical to the first operation flowchart, except that the gain control data write/read prior to the first seek is performed only when information other than servo information is not recorded on the recording medium, that is the recording medium is not "manufacture-formatted" (steps C1 to C6). In this context, "manufacture format" means a physical format produced by a test on a recording medium on which only servo information is recorded before the product is shipped, and differs from a format obtained by the user's formatting. Once the recording medium is manufacture-formatted, format information is recorded in a data area of the data zone. Accordingly, at the time of starting the seek, even if the AGC gain is maximum, not only servo information but also format information is read during the seek of the magnetic head; therefore, the AGC gain is easily stabilized.

When the format information is recorded on the recording medium, set data indicating that the recording medium has been "manufacture-formated" is recorded in an EEPROM 30a in the controller 30 (step C6). Whether or not the recording medium has been manufacture-formatted is determined by checking whether the set data is stored in the EEPROM 30a (step C3). Alternatively, the hard-disk apparatus may be provided with, for example, a dip switch, and the presence of the manufacture format is determined according to the on/off state of the dip switch.

A hard-disk apparatus according to a second embodiment of the present invention will now be described.

According to the first embodiment, before the magnetic head is moved from the CSS zone to the data zone, gain control data is written in or read from the CSS zone. On the other hand, according to the second embodiment, a peak level of the AGC signal is monitored, and, when the monitored peak level is below a predetermined level, the write/read of gain control data is performed.

Figure 7:
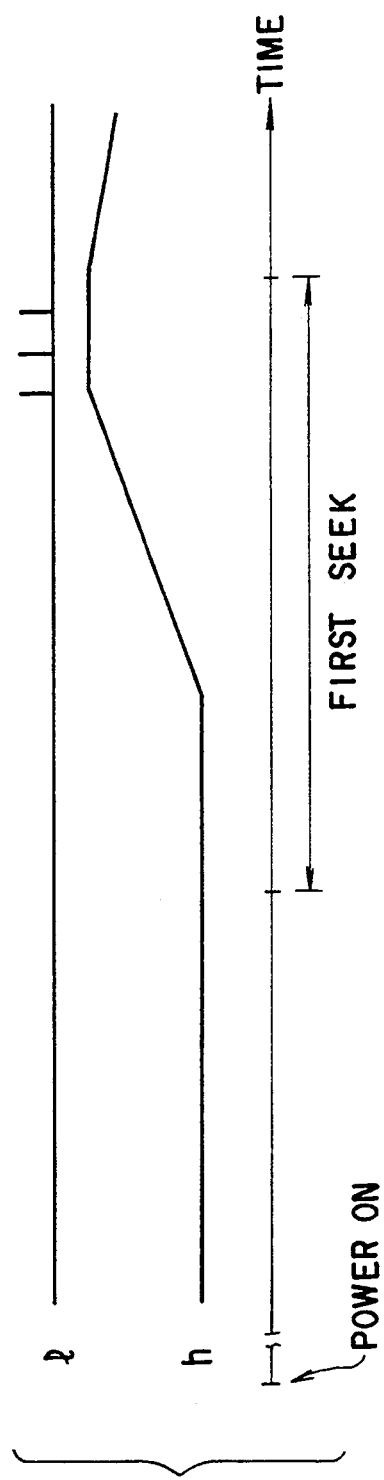
FIG. 7 is a view for illustrating a variation in peak level of an AGC signal in the case where write/read of gain control data is not effected in the CSS zone.

FIG. 7 is a view for illustrating the variation in peak level of the AGC signal in the case where gain control data is not written in or read from the CSS zone. In FIG. 7, h denotes a peak level of an AGC signal output from the AGC amplifier 53, and 1 denotes a sector start signal. When no information is recorded in the CSS zone, the spindle motor is driven after the power is turned on. Even when the rotation speed of the recording medium reaches a predetermined level, the amplitude of the reproduced signal obtained by the magnetic head is very small. Thus, only a reproduced signal having an amplitude less than an amplifier operating amplitude is input to the AGC amplifier. If the first seek is executed in this state from the CSS zone at the radially inward portion of the recording medium (disk) towards the outer peripheral track, the peak level h of the AGC signal increases gradually and stabilizes near the outer peripheral track. At this time point, the generation of the sector start signal is started and servo information is acquired. Consequently, normal speed control (in particular, deceleration control) cannot be performed, and the magnetic head may overrun beyond the radially outermost portion of the recording medium.

In order to solve this problem, it is possible to set the maximum movement speed of the magnetic head at a level lower than a normal one, or to design the AGC amplifier so that the rising of the peak level of the AGC signal appears earlier. If a low driving current were supplied to the voice coil motor at the time of first seek in order to lower the maximum movement speed of the magnetic head, a loss time would always occur when the power is turned on. When a low driving current is applied to the voice coil motor in a hard-disk apparatus having a magnet-type carriage lock mechanism, the lock state by magnetic force is not released and the carriage for supporting the magnetic head cannot move. In addition, if the AGC amplifier is designed so that the rising of the peak level of the AGC signal appears earlier, the readout of normal data would be adversely performed; thus, the optimal designing is difficult.

Under the situation, it can be thought that gain control data is recorded in advance in the CSS zone by the servo writer and the AGC gain is stabilized by using the gain control data. However, since the width of the magnetic head (the width in the radial direction of the recording medium) is generally smaller than the width of the CSS zone, the magnetic head cannot necessarily be situated at a desired position on the CSS zone. This is because a positional displacement arises due to mechanical factors such as the carriage which supports the magnetic head. Considering such a positional displacement due to mechanical factors, it is necessary to record gain control data in a range greater than the width of the magnetic head. This influences the manufacture time of the hard-disk apparatus. By contrast, according to the first embodiment, when power is turned on, gain control data is recorded in the CSS zone by the magnetic head; thus, there is no need to record the gain control data in advance, and the manufacture efficiency can be enhanced.

If the controller for controlling the hard-disk apparatus malfunctioned and the gain control data were recorded in a zone other than the CSS zone, i.e. a data zone, the data recorded in the data zone would be destroyed.

According to the second embodiment of the invention, the gain control data is recorded only in the CSS zone without causing data destruction.

FIG. 8 is a block diagram showing the structure of the hard-disk apparatus according to the second embodiment of the invention. In FIG. 8, a magnetic head 51 is supported by a carriage (not shown). The head 51 is moved in the radial direction of a recording medium (not shown) by the carriage, thus reading/writing data from/on the recording medium. The recording medium has a CSS zone and a data zone. The format of the recording medium is the same as that described in connection with the first embodiment.

A head circuit 52 amplifies a reproduced signal obtained from the recording medium by the magnetic head 51, and the head circuit 52 supplies write signals to the head 51. An AGC amplifier 53 amplifies a reproduced signal a output from the head circuit 52 so that the amplitude of the signal a becomes constant. A binary circuit 54 converts an AGC signal b from the AGC amplifier 53 into a binary signal and outputs a digital read pulse c. A servo decoder 55 detects, as servo information, address data d, index data e, and sector data f from the read pulse c. The address data d indicates a track number of each track, the index data e indicates a start point of each track, and the sector data f indicates a start point of each sector.

A sample/hold circuit 56 samples/holds the amplitude of burst data from the AGC signal b, converts the sampled/held amplitude into a digital value, and outputs the digital value as burst data g to a CPU 57.

The CPU 57 controls the whole hard-disk apparatus. A voice coil motor (VCM) 59 is designed to move the carriage for supporting the magnetic head 51. The head 51 is fixed at one end portion of the carriage, and the VCM 59 is attached to the other end-portion of the carriage. Accordingly, the carriage swings about a rotational shaft by operation of VCM 59. A VCM driver 58 drives the VCM 59 under control of CPU 57. A read/write data conversion circuit (ENDEC) 60 decodes the read pulse c and outputs the decoded read pulse c as an NRZ (non return to zero) read signal y to a hard-disk controller (HDC) 61. In addition, the ENDEC 60 encodes an NRZ write signal z from the hard-disk controller 61 and outputs the encoded NRZ write signal z as a write signal x to the head circuit 52. The hard-disk controller 61 performs data read/write processing in the present hard-disk apparatus and interface processing between the hard-disk apparatus and a host system (not shown).

In the hard-disk apparatus of the second embodiment shown in FIG. 8, a capacitor 62 is connected to the AGC amplifier 53. The capacitor 62 monitors a peak level h of the AGC signal c output from the AGC amplifier 53. A comparator 63 compares the peak level (voltage value) h of the AGC signal b with a preset slice level (voltage value) i, and outputs a signal j representing the comparison result. When the peak level h of the AGC signal b is lower than the slice level i (i.e. no information is recorded in the CSS zone), the signal j is at a high level; when the peak level h of the AGC signal b is higher than the slice level i (i.e. information is recorded in the CSS zone), the signal j is at a low level. The signal j is supplied to and monitored by the CPU 57.

An AND gate 64 supplies a set command signal O (for setting a servo gate signal t) from the CPU 57 to one terminal of a NOR gate 68 only when the signal j is at the high level. The AND gate 64 performs a logical arithmetic operation between the signal j and set command signal k, and outputs a signal o representing the result of the arithmetic operation. An OR gate 65 performs a logical arithmetic operation between the index data e and sector data f from the servo decoder 55, and outputs a logic signal representing the logic operation result as a sector start signal 1. A timer 66 receives the sector start signal 1, and outputs a set signal p after a time t1 and a reset signal q after a time t2.

The NOR gate 67 performs a logic arithmetic operation between a reset command signal m (for resetting the servo gate signal t) from the CPU 57 and the reset signal q from the timer 66, and outputs a logic signal r representing the operation result. A NOR gate 68 carries out a logic arithmetic operation between the signal o from the AND gate 64 and the set signal p from the timer 66 and outputs a logic signal s representing the operation result. A flip-flop 69 outputs a servo gate signal t which is set by the logic signal s from the NOR gate 68 and reset by the logic signal r from the NOR gate 67. An OR gate 70 performs a logic arithmetic operation between index command signal n from the CPU 57 and index signal e from the servo decoder 55 and outputs a logic signal u representing the operation result. An AND gate 71 performs a logic arithmetic operation between a write gate signal v from the hard-disk controller 61 and servo gate signal t from the flip-flop 9 and outputs a logic signal representing the logic operation result as a write enable signal w. The write enable signal w is delivered to the read/write data conversion circuit (ENDEC) 60 and the head circuit 52.

Figure 9:
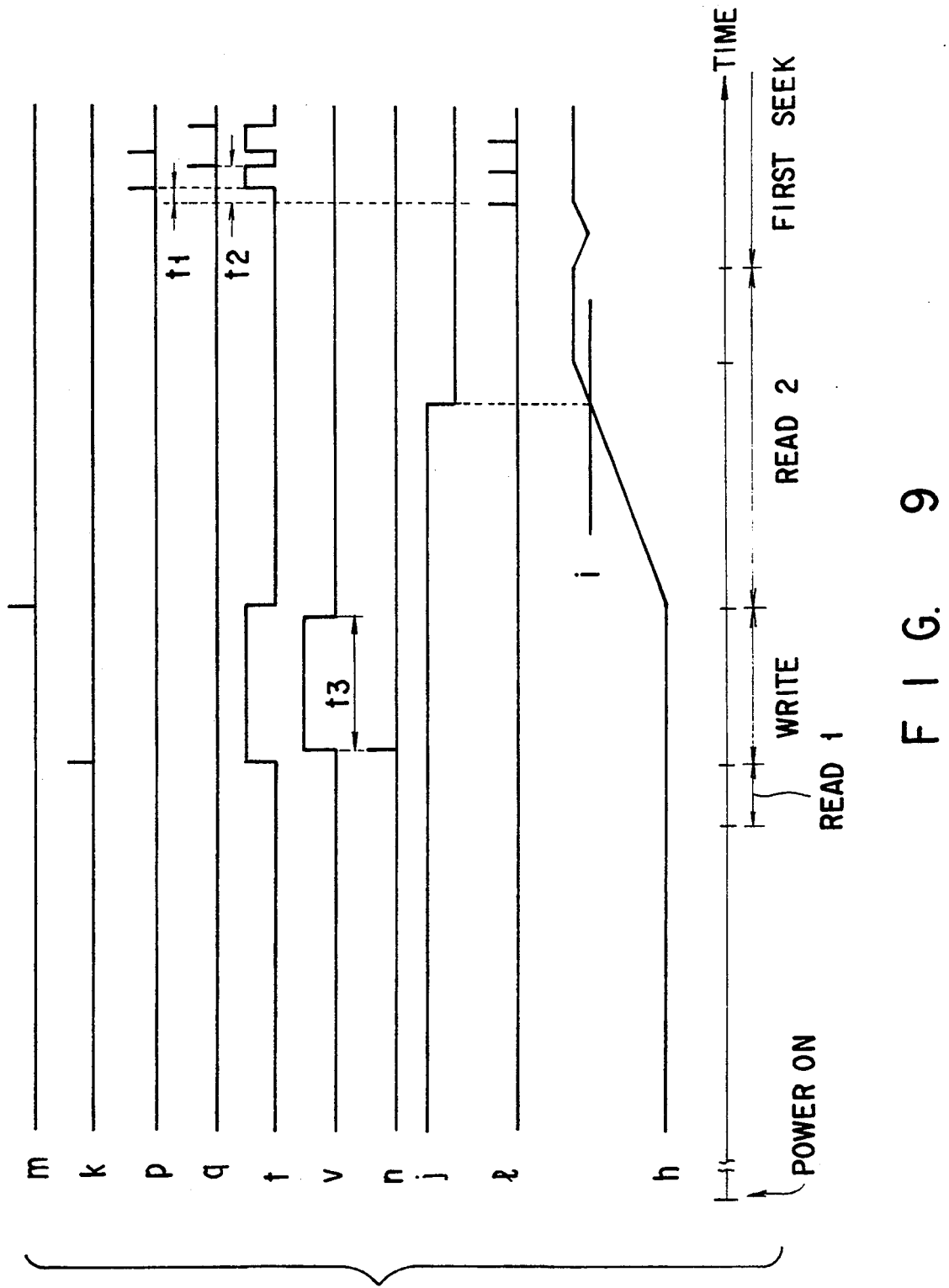
FIG. 9 is a timing chart of the signals produced in the hard-disk apparatus shown in FIG. 8.

The operation of the hard-disk apparatus of the second embodiment will now be described with reference to FIG. 9. FIG. 9 is a timing chart of the signals produced in the hard-disk apparatus shown in FIG. 8.

When power is supplied to the hard-disk apparatus, the spindle motor is driven to rotate the recording medium. The rotation speed of the medium reaches a normal level within about one second, though it depends on inertia. The CSS zone is provided in the radially inner portion of the recording medium. When no information is recorded in the CSS zone, the amplitude of the reproduced signal a output from the head circuit 52 is less than the amplifier operating amplitude of the AGC amplifier 53 and accordingly the peak level h of the AGC signal is lower than the slice level i. Thus, the signal j output from the comparator 63 is at the high level, and the set command signal k for setting the servo gate signal t is supplied to one terminal of the NOR gate 68 via the AND gate 64.

When power is turned on, the servo gate signal t is set at the low level (in the reset state) by the reset command signal m. In addition, the write gate signal v from the hard-disk controller 61 is set at the low level (in the reset state). Accordingly, the write enable signal w output through the AND gate 71 to the head circuit 52 is set at the low level and the write of information is inhibited.

When the recording medium is set in the normal rotation state, the head circuit 52 is set in the read state (READ 1). Since the signal j is at the high level, the CPU 57 determines that no information is recorded in the CSS zone and outputs the set command k. Consequently, the servo gate signal t is set at the high level. When the index command n for indicating the write start is output from the CPU 57 through the OR gate 70 to the hard-disk controller 61, the hard-disk controller 61 outputs the high-level write gate signal v during time t3 which is greater than the time required for one rotation of the track, and simultaneously outputs the NRZ write signal z to the read/write data conversion circuit (ENDEC) 60. Consequently, the write enable signal w from the AND gate 71 is at a high level, the write signal x is output from the ENDEC 60 to the head circuit 52, and the gain control data is written in the CSS zone of the recording medium by means of the magnetic head 51 (WRITE).

The CPU 57 outputs the reset command signal m after the passage of time t3 from the time of output of the index command signal n. Thereby, the write operation is completed, and the gain control data written in the CSS zone is read out (READ 2). At this time, since the reproduced signal a has a desired amplitude, the peak level h of the AGC signal increases gradually. After passage of a predetermined time period (several-ten ms), the peak level of the AGC signal is kept substantially constant.

The CPU 57 starts the first seek after passage of a predetermined time from the time the gain control data is written or the signal j is set at the low level, that is, after passage of such a time as to make the peak level of the AGC signal substantially constant. By the first seek, the magnetic head 51 moves from a region of the CSS zone where information is recorded to another region of the CSS zone where information is not recorded. Accordingly, the peak level h of the AGC signal decreases gradually, and increases once again when the head 51 has reached an area on the data zone where servo information is recorded.

When the peak level of the AGC signal is stabilized and servo information is normally read out, the binary circuit 54 produces the read pulse c on the basis of the AGC signal b, and the servo decoder 55 outputs to the OR gate 70 either the index data e or sector data f obtained on the basis of the read pulse c. The sector start signal 1 obtained by the logic arithmetic operation between the index data e and sector data signal f is input to the timer 66. The timer 66 outputs the set signal p after time t1 from the time it receives the sector start signal 1, and the reset signal q after time t2 from the time it receives the sector start signal 1.

The set signal p and reset signal q are supplied to the flip-flop 69 via NOR gates 67 and 68 and used as a set signal and a reset signal for the flip-flop 69. Accordingly, the servo gate signal t output from the flip-flop 69 is generated at the timing as shown in FIG. 9. Specifically, until time t1 has passed from the generation of sector start signal 1, the magnetic head moves over the servo area and therefore the write disable state is maintained. From time t1 to time t2, the write enable state is set. After passage of time t2, the magnetic head moves over the servo area of the next sector and the write disable state is set once again. During the first seek, this change of state is repeated, and the CPU 57 receives the address data d from the servo decoder 55 and the burst data g from the sample/hold circuit 56. Thereby, the VCM 59 is driven by the VCM driver 58, and the magnetic head is moved to the outer peripheral track.

Figure 10:
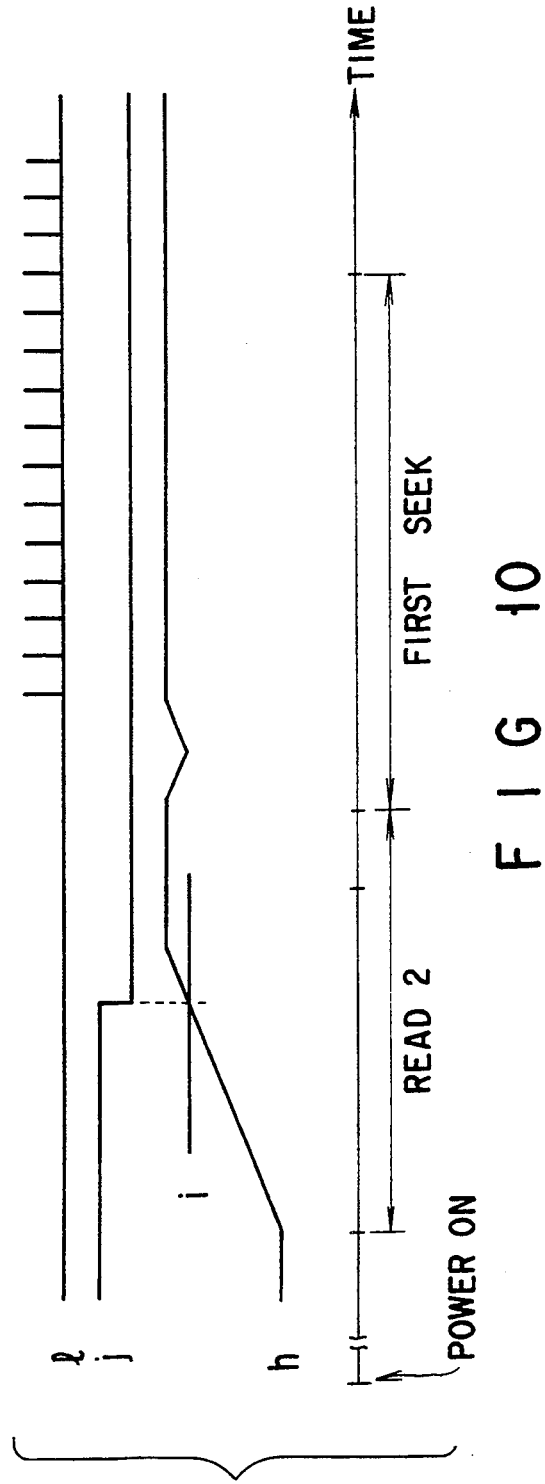
FIG. 10 is a timing chart of some of the signals shown in FIG. 9.

By the above operation, when the power is turned on after the gain control data is recorded in the CSS zone, the peak level of the AGC signal is set in the stable state before the number of revolution of the recording medium reaches a predetermined number of revolution, as shown in FIG. 10. Accordingly, the first seek can be started just after the rotation speed of the recording medium reaches a predetermined value, and the magnetic head 51 can surely be moved to the outer peripheral track.

When the peak level h of the AGC signal b is higher than the slice level i, that is, the signal j is at the low level, the set command signal k from the CPU 57 is rendered invalid in the AND gate 64. Therefore, even if the CPU 57 erroneously outputs the set command signal k by a bug in firmware or noise due to static electricity, the servo gate signal t is not set at the high level while the magnetic head moves over the servo area and therefore the servo information is not destroyed by the malfunction of the CPU. In the meantime, in general magnetic disk apparatuses, the signal j does not have the low level in a zone other than the CSS zone; therefore, even if the present invention is applied, data is not destroyed.

As has been described above, according to the present invention, the gain control data is recorded in the CSS zone of the recording medium before the first seek is executed. Thus, the servo information can exactly be acquired just after the first seek is started without lowering the manufacture efficiency of the apparatus. Thereby, for example, in a sector servo type hard-disk apparatus, the overrun of the magnetic head in the first seek can be prevented.

In addition, the peak level of the AGC signal is monitored and, only when the peak level is lower than a predetermined level, the write/read of gain control data in/from the recording medium is allowed; therefore, even if the CPU malfunctions, data destruction is prevented.

A third embodiment according to the present invention will be described below.

Power is turned on and the number of the revolution of a recording medium reaches a desired number of the revolutions, thereby floating the magnetic head from the recording medium. An AGC gain of an AGC amplifier is then set at a suitable value. The suitable value corresponds to an AGC gain of the AGC amplifier necessary to obtain an output signal having a desired voltage level. When a voltage level of a reproduced signal from the magnetic head is a suitable voltage level set as a design form of a hard-disk apparatus, the desired voltage level of the output signal is obtained by amplifying the voltage level of the reproduced signal. The suitable value is defined in advance by a test for the hard-disk apparatus. The desired voltage level represents a level capable of reading out data recorded in the recording medium without an error.

Figure 11:
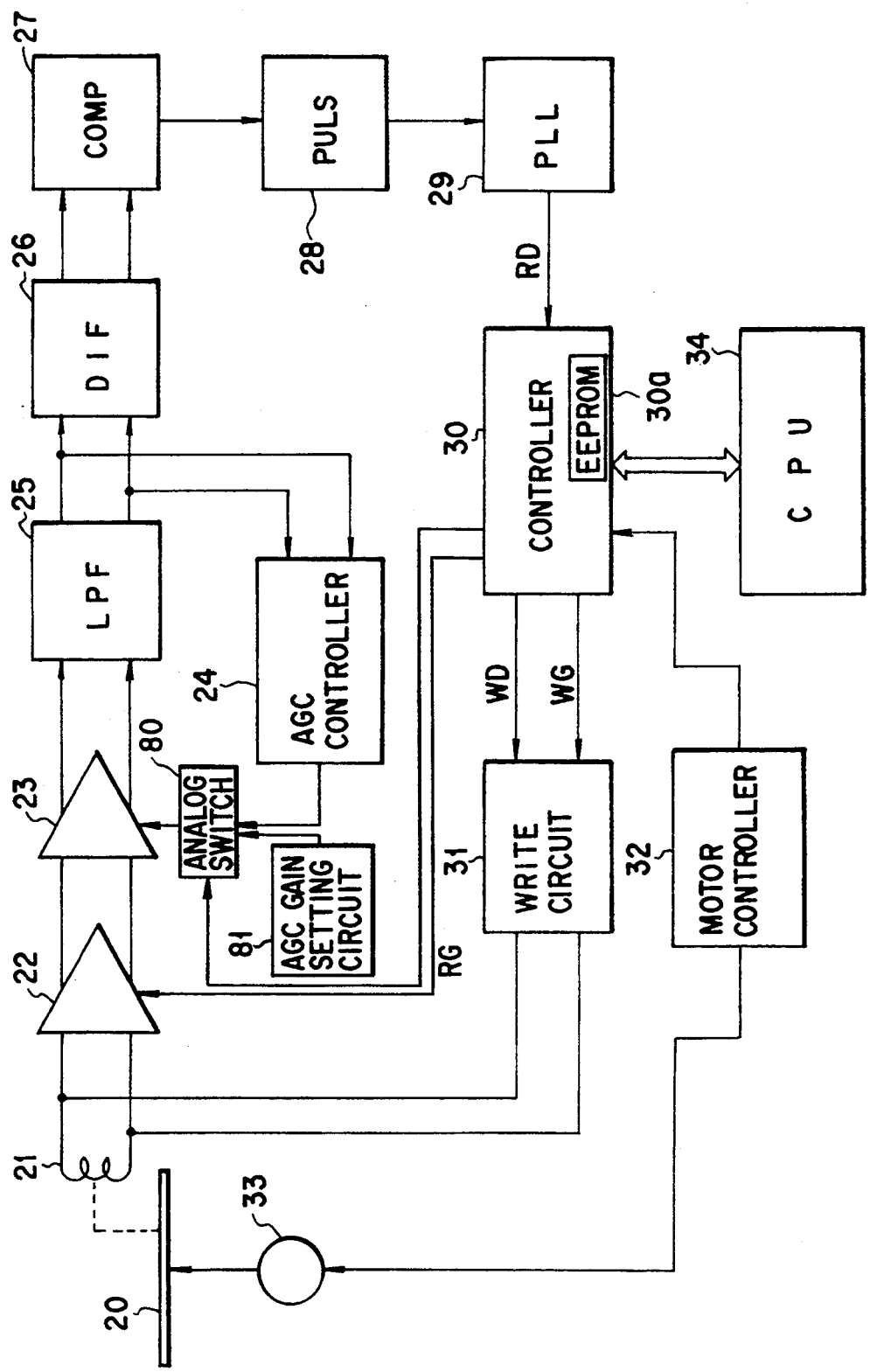
FIG. 11 is a block diagram showing the structure of a hard-disk apparatus according to a third embodiment of the invention.

FIG. 11 is a block diagram showing the structure of a hard-disk apparatus according to a third embodiment of the invention. In comparison with the apparatus of FIG. 3, the apparatus shown in FIG. 11, further includes an analog switch 80 and an AGC gain setting circuit 81. That is, the analog switch 80 is arranged between the AGC amplifier 23 and the AGC controller 24. One input terminal of the analog switch 80 is connected to an output terminal of the AGC controller 24. The other terminal of the analog switch 80 is connected to an output put terminal of the AGC gain setting circuit 81. The analog switch 80 passes through a signal from the AGC controller 24 or the AGC gain setting circuit 81 in accordance with a control signal output from the controller 30.

At the time till a first seek starts after the power is turned on, the analog switch 80 is controlled in accordance with a control signal output from the controller 30, and an output signal of the AGC gain setting circuit 81 is input into the AGC amplifier 23, thereby a suitable gain is set into the AGC amplifier 23 by the output signal of the AGC gain setting circuit 81. Therefore, the magnetic head during the first seek does not overrun. After the power is turned on, the AGC gain setting circuit 81 continues to output a control signal for setting a suitable gain into the AGC amplifier 23.

The third embodiment can be applied to a hard-disk apparatus having a recording medium in which a CSS zone is placed. The third embodiment is suitable to apply to a hard-disk apparatus of a ramp load type having a recording medium in which a CSS zone is not placed, as will be described below. In the hard-disk apparatus of the ramp load type, when the power is turned off, the magnetic head is moved outside a recording medium and is locked not to contact the magnetic head with the recording medium. Therefore, when the hard-disk apparatus is not operated and a shock from outside is provided to the hard-disk apparatus, it can be prevented that the magnetic head or the recording medium is damaged by contacting the magnetic head with the recording medium. In the hard-disk apparatus of the ramp load type, after the power is turned on, when the magnetic head is moved from a lock position to the recording medium rotating at the number of constant revolution, since the magnetic head is loaded by a cam mechanism having a ramp, such hard-disk apparatus is referred to the ramp load type.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A hard disk drive comprising:
   a recording medium having a data zone in which servo data is recorded and a contact start and stop zone;
   head means for recording or reading data to/from the recording medium;
   head moving means for moving the head means to a desired position over the recording medium;
   automatic gain controlled amplifier means for amplifying an output signal from the head means to obtain the output signal having a desired level; and
   gain setting means for setting a gain of the automatic gain controlled amplifier means at a suitable value after power is turned on and before the head means is moved to the desired position over the data zone of the recording medium by the head moving means by writing data to the contact start and stop zone and reading the data from the contact start and stop zone by the head means.

2. The hard disk drive according to claim 1, further comprising:
   means for determining whether data other than the servo data is recorded on the recording medium; and
   means for disabling data-write or read to from the contact start and stop zone when data other than the servo data is recorded on the recording medium.

3. The hard disk drive according to claim 2, further comprising means for disabling data writing to the recording medium in accordance with a peak level of the output signal amplified by the automatic gain controlled amplifier means.

4. The hard disk drive according to claim 3, wherein the data writing to the recording medium is disabled when the peak level of the output signal is higher than a predetermined level.

5. A method for setting a gain of an automatic gain controlled amplifier means of a hard disk drive, the hard disk drive including a recording medium having a data zone in which at least servo data is recorded and a contact start and stop zone, and a magnetic head, the method comprising the steps of:
   setting the gain of the automatic gain controlled amplifier means at a suitable value after power is turned on and before the magnetic head is moved to a desired position over the data zone of the recording medium by writing data to the contact start and stop zone and reading the data from the contact start and stop zone using the magnetic head; and
   moving the magnetic head to the desired position over the data zone of the recovering medium after the gain of the automatic gain controlled amplifier means is set.

6. The method according to claim 5, further comprising the steps of:
   determining whether data other than the servo data is recorded on the recording medium; and
   disabling data-write/read to/from the contact start and stop zone when data other than the servo data is recorded on the recording medium.

7. The method according to claim 6, further comprising the step of disabling data writing to the recording medium in accordance with a peak level of an output signal from the automatic gain controlled amplifier.

8. The method according to claim 7, wherein to the data writing to the recording medium is disabled when the peak level of the output signal is higher than a predetermined level.

9. A hard disk drive comprising:
   a recording medium having a data zone in which servo data is recorded and a contact start and stop zone in which gain control data is recorded;
   head means for writing data to or reading data from the recording medium;
   head moving means for moving the head means to a desired position over the recording medium;
   automatic gain controlled amplifier means for amplifying an output signal from the head means to obtain an output signal having a desired signal level; and
   gain setting means for setting a gain for the automatic gain controlled amplifier means at a suitable value by reading out the gain control data from the recording medium after power is turned on and before the head means is moved to the desired position over the data zone of the recording medium by the head moving means.

10. The hard disk drive according to claim 9, further comprising:
    means for determining whether data other than the serve data is recorded on the recording medium; and
    means for disabling the reading of data from the contact start and stop zone when data other than the servo data is recorded on the recording medium.

11. The hard disk driving according to claim 10, further comprising means for disabling data writing to the recording medium in accordance with a peak level of the output signal amplified by the automatic gain controlled amplifier means.

12. The hard disk drive according to claim 11, wherein the data writing to the recording medium is disabled when the peak level of the output signal is higher than a predetermined level.

13. A method for setting a gain of an automatic gain controlled amplifier means of a hard disk drive, the hard disk drive including a recording medium having a data zone in which servo data is recorded and a constant start and stop zone in which gain control data is recorded, and a magnetic head, the method comprising the steps of:
reading out the gain control data from the contact start and stop zone by the magnetic head after power is turned on;
setting the gain of the automatic gain controlled amplifier means at a suitable value in accordance with the read out gain control data; and
moving the magnetic head to a desired position over the data zone of the recording medium after the gain is set.

14. The method according to claim 13, further comprising the steps of:
determining whether data other than the servo data is recorded on the recording medium; and
disabling the reading of data from the contact start and stop zone when data other than the servo data is recorded on the recording medium.

15. The method according to claim 14, further comprising the step of disabling data writing to the recording medium in accordance with a peak level of an output signal from the auto gain controlled amplifier.

16. The method according to claim 15, wherein the data writing to the recording medium is disabled when the peak level of the output signal is higher than a predetermined level.

17. A hard disk drive comprising;
a recording medium having a data zone in which servo data is recorded and a contact start and stop zone;
head means for recording to or reading data from the recording medium;
head moving means for moving the head means to a desired position over the recording medium;
automatic gain controlled amplifier means for amplifying an output signal from the head means to obtain a desired output signal level;
gain setting means for setting a gain of the automatic gain controlled amplifier means at a suitable value after power is turned on and before the head means is moved to the desired position over the data zone of the recording medium by the head moving means, the gain setting means setting the gain by writing data to the contact start and stop zone by the head means and reading the data form the contact start and stop zone by the head means;
means for determining whether data other than the servo data is recorded on the recording medium; and
means for disabling data-write/read to/from the contact start and stop zone when data other than the servo data is recorded on the recording medium.

18. The hard disk drive according to claim 17, further comprising means for disabling data writing to the recording medium in accordance with a peak level of the output signal amplified by the automatic gain controlled amplifier means.

19. The hard disk drive according to claim 18, wherein data writing to the recording medium is disabled when the peak level of the output signal is higher than a predetermined level.

20. A method for setting a gain of an automatic gain controlled amplifier means of a hard disk drive, the hard disk drive including a recording medium having a data zone in which servo data is recorded and a contact start and stop zone, and a magnetic head, the method comprising the steps of:
setting the gain of the automatic gain controlled amplifier means at a suitable value after power is turned on and before the magnetic head is moved to a desired position over the data zone of the recording medium, the gain of the automatic gain controlled amplifier means is set by writing data to the contact start and stop zone and reading the data from the contact start and stop zone by the magnetic head;
moving the magnetic head to the desired position over the data zone of the recording medium after the gain is set;
determining whether data other than the servo data is recorded on the recording medium; and
disabling data-write/read to/from the contact start and stop zone when data other than the servo data is recorded on the recording medium.

21. The method according to claim 20, further comprising the step of disabling data writing to the recording medium in accordance with a peak level of an output signal from the automatic gain controlled amplifier means.

22. The method according to claim 21, wherein data writing to the recording medium is disabled when the peak level of the output signal is higher than a predetermined level.

23. A hard disk drive comprising:
a recording medium having a data zone in which servo data is recorded;
head means for recording to or reading data from the recording medium;
head moving means for moving the head means to a desired
automatic gain controlled amplifier means for amplifying an output signal from the head means to obtain a desired output signal level;
gain setting means for setting a gain of the automatic gain controlled amplifier means at a suitable value after power is turned on and before the head means is moved to the desired position over the data zone of the recording medium by the head moving means;
means for determining whether data other than the servo data is recorded on the recording medium; and
means for disabling data-write/read to/from the recording medium when data other than the servo data is recorded on the recording medium.

24. The hard disk drive according to claim 23, further comprising means for disabling data writing to the recording medium in accordance with a peak level of the output signal amplified by the automatic gain controlled amplifier means.

25. The hard disk drive according to claim 24, wherein data writing to the recording medium is disabled when the peak level of the output signal is higher than a predetermined level.

26. A method for setting a gain of an automatic gain controlled amplifier means of a hard disk drive, the hard disk drive including a recording medium having a data zone in which servo data is recorded, and a magnetic head, the method comprising the steps of:

setting the gain of the automatic gain controlled amplifier means at a suitable value after power is turned on and before the magnetic head is moved to a desired position over the data zone of the recording medium;

moving the magnetic head to the desired position over the data zone of the recording medium after the gain is set;

determining whether data other than the servo data is recorded on the recording medium; and disabling data-write/read to/from the recording medium when data other than the servo data is recorded on the recording medium.

27. The method according to claim 26, further comprising the step of disabling data writing to the recording medium in accordance with a peak level of an output signal from the automatic gain controlled amplifier means.

28. The method according to claim 27, wherein data writing to the recording medium is disabled when the peak level of the output signal is higher than a predetermined level.

* * * * *

UNITED STATES PATENT AND TRADEMARK OFFICE
CERTIFICATE OF CORRECTION

PATENT NO. : 5,373,403
DATED : December 13, 1994
INVENTOR(S) : Hiroshi OKAMURA et al.

It is certified that error appears in the above-indentified patent and that said Letters Patent is hereby corrected as shown below:

Claim 10, Column 12, Line 56, change "serve" to --servo--.

Claim 23, Column 14, Line 41, after "desired", insert --position over the recording medium;--.

Signed and Sealed this

Sixth Day of June, 1995

Attest:

BRUCE LEHMAN

Attesting Officer

Commissioner of Patents and Trademarks